United States Patent

[11] 3,572,014

| [72] | Inventor | Gunnar W. Hansen<br>Ypsilanti, Mich. |
|---|---|---|
| [21] | Appl. No. | 772,684 |
| [22] | Filed | Nov. 1, 1968 |
| [45] | Patented | Mar. 23, 1971 |
| [73] | Assignee | Ford Motor Company<br>Dearborn, Mich. |

[54] ENGINE AIR CLEANER CARBON BED FILTER ELEMENT CONSTRUCTION
8 Claims, 4 Drawing Figs.

[52] U.S. Cl. ................................................. 55/316,
55/482, 55/510, 123/136
[51] Int. Cl. ....................................................... B01d 50/00
[50] Field of Search........................................... 55/316,
180, 179, 510, 498, 387, 388, 389; 123/36

[56] References Cited
UNITED STATES PATENTS
| 2,221,717 | 11/1940 | Nicholson | 55/322 |
| 3,298,149 | 1/1967 | Sobeck | 55/482 |
| 3,477,210 | 11/1969 | Hervert | 123/119 |
| 1,968,312 | 7/1934 | Rensink | 55/276 |
| 2,052,931 | 9/1936 | Lednum et al. | 55/179 |
| 2,122,111 | 6/1938 | Poelman et al. | 55/316 |
| 2,896,742 | 7/1959 | McMichael | 55/276 |
| 2,996,145 | 8/1961 | Thornburgh | 55/498 |
| 3,221,724 | 12/1965 | Wentworth | 123/136 |
| 3,277,876 | 10/1966 | Abts | 55/510 |
| 3,368,326 | 2/1968 | Hervert | 123/136 |

Primary Examiner—Frank W. Lutter
Assistant Examiner—Bernard Nozick
Attorneys—John R. Faulkner and Robert E. McCollum ABSTRACT: An engine air cleaner has an axial flow fuel vapor filter element of activated carbon, the element having an annular bafflelike solid sidewall and perforated screens for the remaining walls; alternately, more than one wall is formed of solid material to restrict fuel vapor breakthrough either to the atmosphere or to the carburetor.

INVENTOR.
GUNNAR W. HANSEN
BY John R. Faulkner
Robert E. McCollum

INVENTOR.
GUNNAR W. HANSEN
BY John R. Faulkner
Robert S. McCollum
ATTORNEY

ENGINE AIR CLEANER CARBON BED FILTER ELEMENT CONSTRUCTION

This invention relates, in general, to the air cleaner of an internal combustion engine. More particularly, it relates to an air cleaner containing a fuel vapor adsorbent filter element.

Engine air cleaner assemblies containing activated carbon bed filter elements to adsorb fuel vapors at times are known, such as, for example, those shown and described in my copending application Ser. No. 769,584, titled Fuel Vapor Emission Control, filed Oct. 22, 1968, and having a common assignee. Filters of the type described in Ser. No. 769,584 generally are of the radial flow type with plastic or similar type end members, and generally a single fuel vapor baffle means to inhibit backflow of fuel vapors towards the inlet of the air cleaner.

This invention relates to the configuration of a carbon bed element filter that increases fuel vapor retention by utilizing a fuel vapor baffle means as at least one wall of the carbon element.

It is an object of the invention, therefore, to provide an axial flow carbon bed element type filter that increases the fuel vapor retention capabilities, reduces the fuel vapor losses to the atmosphere, and reduces airflow restriction through the carbon bed element.

It is also an object of the invention to provide an axial flow type carbon bed filter element having a concentrically mounted baffle member forming one side of the element and projecting vertically beyond it to act as an inhibitor for the reverse flow of fuel vapors towards the inlet of the air cleaner until after the capacity of the filter element to adsorb fuel vapors has been exceeded.

It is a still further object of the invention to provide an axial flow carbon bed filter element construction consisting of an annular concentrically mounted baffle means forming one wall of the element with the remaining sides of the filter element consisting of perforated metal screens or plates.

It is also an object of the invention to provide an axial flow carbon bed filter element construction consisting of an element having a pair of sides defined by concentrically mounted, vertically disposed annular baffle means, the remaining portions being defined by rigid perforated screens or plates, the two baffle means extending vertically beyond the filter element to define the ultimate fuel vapor level obtainable before vapor breakthrough or pour over; an additional baffle cooperating with the radially innermost baffle to define an annular channel connected essentially at right angles to the space below the filter element so as to minimize the access of fuel vapors to the air cleaner outlet.

Other objects, features and advantages of the invention will become more apparent upon reference to the succeeding detailed description thereof, and to the drawings illustrating the preferred embodiments thereof, wherein.

Figure 1:
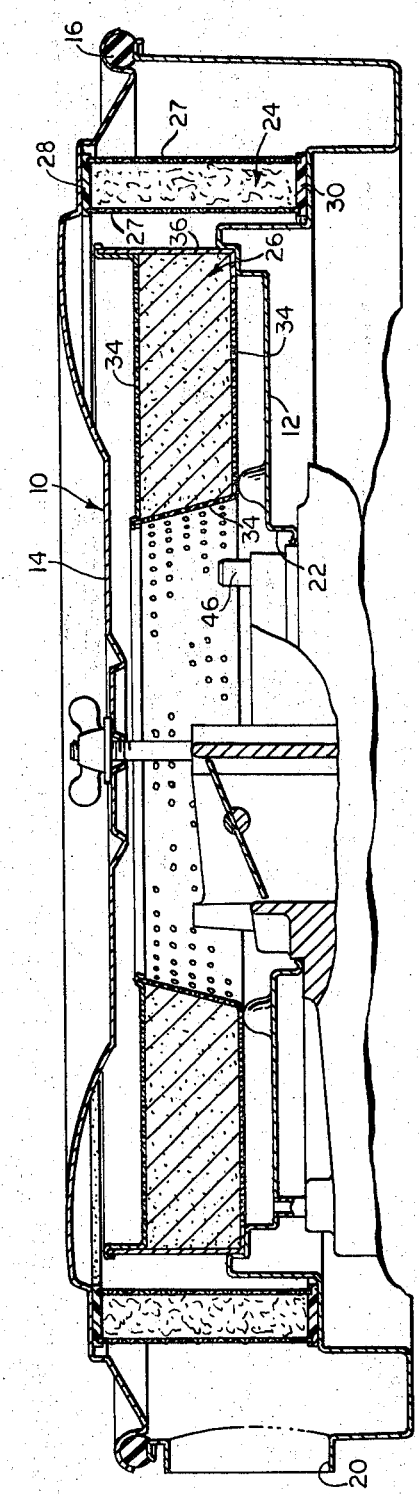
FIG. 1 is a cross-sectional view of an air cleaner assembly embodying the invention.
Figure 2:
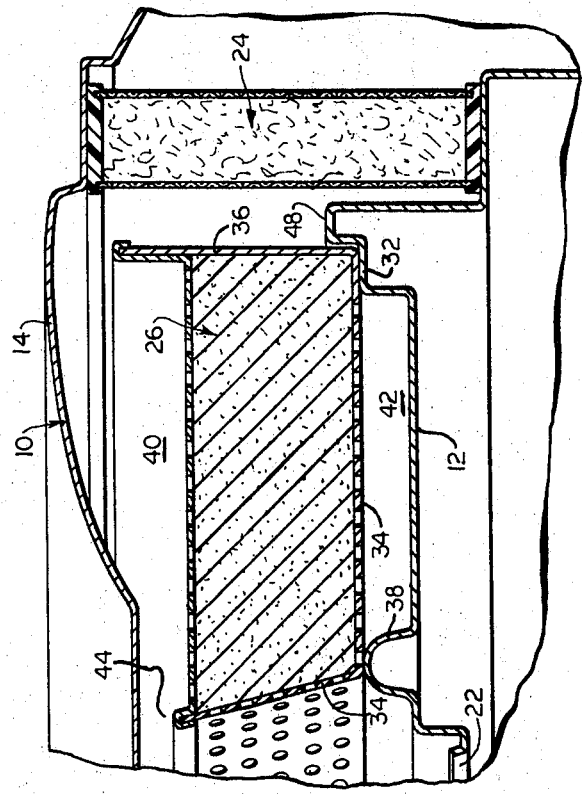
FIG. 2 is an enlarged view of a portion of the FIG. 1 showing.

FIG. 1 shows the housing 10 of an essentially horizontally disposed internal combustion engine air cleaner. It includes a lower tray portion 12 that is essentially U- or dish-shaped U-or dish-shaped in cross section, and a cover member 14 with an annular seal 16 therebetween. The vertical sidewall portion of tray portion 12 includes a tubular fresh air inlet 20 leading into the hollow interior of housing 10. Tray portion 12 has an axial opening 22 that is adapted to be located over the air horn portion of a downdraft type carburetor, not shown. The air cleaner generally is secured to the carburetor by a bail member, not shown, having one end inserted in the carburetor and having a threaded end projecting through cover 14 and engaged by a wing nut.

Tray portion 12 has a number of stepped diameter portions defining shoulders for the seating thereagainst of two annular filter elements 24 and 26. Element 24 may be a conventional pleated paper, dry element type, the paper being porous for the passage of air flow therethrough in a radial direction but the nonflow of foreign particles, in a known manner. In this case the pleated paper may be held between a pair of annular metal perforated screens 27 having their edges imbedded or suitably secured in annular end caps 28 and 30. The axial width of the filter element 24 in this case is such that it sealingly engages the tray and cover portions of the air cleaner so that all air flow through inlet 20 must pass radially through the filter element 24.

Seated against another shouldered portion 32 of tray portion 12 of tray portion 12 is one edge of the filter element 26. The latter is essentially rectangular in cross section, as shown, and contains a bed of activated carbon within its four walls. Three of the walls are made of perforated metal screens 34, the fourth wall constituting a concentrically mounted nonperforated annular baffle 36. The baffle extends vertically beyond the top screen 34, for a purpose to be described later.

The filter 26, in addition to being supported at one edge on shoulder 32, is supported at the opposite radial edge by a number of circumferentially spaced portions 38 embossed from lower tray portion 12. The supporting of the filter 26 in this manner defines annular clearance spaces or chambers 40 or 42 between the upper and lower portions of the filter and the cover and tray portions, respectively. The upper chamber 40 communicates with the air discharged through filter 24 around baffle 36 and through a restricted area 44 before communicating with the outlet 22.

The restricted space 44 constitutes an orifice that is in parallel with the orifice defined by the bed of carbon particles in filter 26 offering restriction to flow therethrough.

The lower chamber or space 42 is in communication with a tube 46 containing fuel vapors. The latter, in this case, is connected to the vapor space in the carburetor fuel bowl. It is within the scope of the invention, however, to connect it to the vehicle gasoline tank, and/or any other source of fuel vapors so that excessive vapors will be vented into the lower space 42 to be adsorbed by the activated carbon bed instead of being vented externally into the atmosphere.

The size of the carbon particles contained in filter 26 will, of course, be a matter of choice to provide the desired purge flow through the element, and the size of bypass 44 then is chosen to provide a pressure differential across the orifice 44 that will assure the chosen purge flow through filter element 26.

In operation, when the engine with which the air cleaner assembly is associated is shut down after having been warmed up, or the ambient air temperature conditions are such that a large variation in temperature occurs in the vicinity of the fuel reservoirs, considerable fuel will vaporize, resulting in increased fuel vapor pressure in line 46. These fuel vapors will be forced axially upwardly through the side and bottom screens 34 of filter element 26 and be progressively adsorbed by the carbon particles. Since the hydrocarbons are heavier than air, if it were not for the annular concentric solid baffle 36, as soon as the fuel vapor had saturated the filter to a level above the shoulder 48, the fuel vapors would then pour over through the pleated paper element 24 and breakthrough into the atmosphere through the inlet 20. This, of course, is undesirable as it is preferable to reduce the emission of fuel vapors into the atmosphere at all times.

The baffle means 36 precludes the above action. Even though vapor breakthrough should occur, the fuel vapor buildup will continue until the fuel vapor level has reached the top of baffle means 36. By this time, however, the carbon bed filter element 26 will have become completely saturated, i.e., its capacity completely utilized before breakthrough of the fuel vapor through the air filter element 24 occurs. It will be seen, therefore, that a considerable volume of fuel vapors would be required to exceed the capacity of the system before spill over or breakthrough to the atmosphere occurs.

When the engine is started, the normal piston operation provides a depression in the outlet 22 effective to cause a significant pressure differential between the outlet and the air in inlet 20. Air will then flow through inlet 20 and filter element 24, be guided around the end edge of the baffle 36 and through both the carbon bed filter element 26 as well as through the bypass orifice 44. Accordingly, the airflow through the filter will desorb or purge the filter of fuel vapors, the flow occurring in a direction through the filter side and bottom into lower section 42, and finally into outlet 22 to be burned in the engine. Accordingly, it will be seen that when the engine is operating in a normal manner that the filter element will be effectively desorbed of fuel vapors and readied for the next cycle of adsorption when the engine is again shut down. The area of the clearance space 44 is chosen to provide the desired restriction to assure the necessary purge flow through the activated carbon element 26 without unduly restricting the overall airflow into the engine. Thus, the size of the bypass will control the overall pressure drop through the air cleaner assembly so that the fuel vapors will be purged into the engine, and yet all of the engine air requirements will be met.

Figure 3:
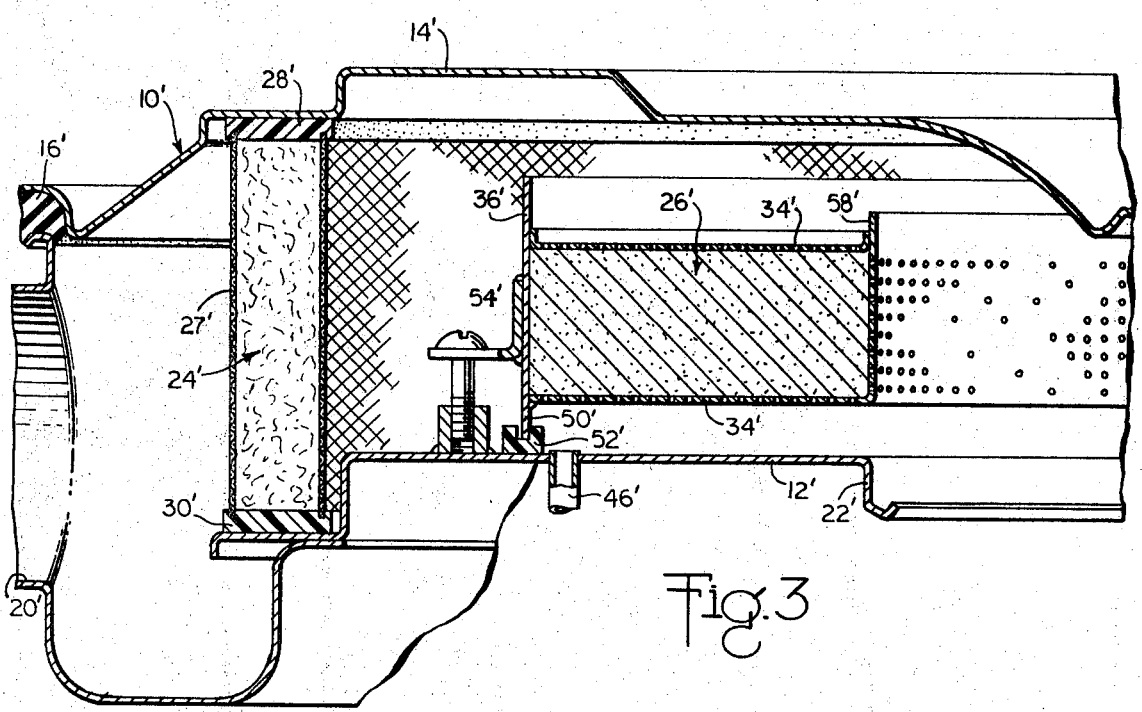
FIGS. 3 and 4 are modifications of the FIG. 2 showing.

FIG. 3 shows a modification of the FIG. 1 construction. In this instance, the filter element is constructed essentially in the same manner as in FIG. 1 with the annular baffle 36' extending vertically above the filter as shown in FIG. 1. The mounting of the filter, however, is slightly different. The lower portion of the baffle 36' is extended at 50 and imbedded in an annular portion 52 of plastic or similar material that suitably seals against the carbon tray lower portion 12'. An L-shaped bracket 54 secures baffle 36' by an adjustable nut and bolt connection 56 to the tray member 12'.

The radially downstream or side portion 34' of the filter element again has an annular vertical projection 58 from the top thereof to permit an accurate control of the area of bypass 44'. As will be clear, the fuel vapor will build up to a level determined by the vertical height of the baffle means 36'. This, or course, will cause a spill over of fuel vapor past baffle 58 to the carburetor or to the outlet. As stated above, the projection 58 controls the bypass passage area. In all other respects, however, the operation and construction of FIG. 3 remains essentially the same as that of FIG. 1.

Figure 4:
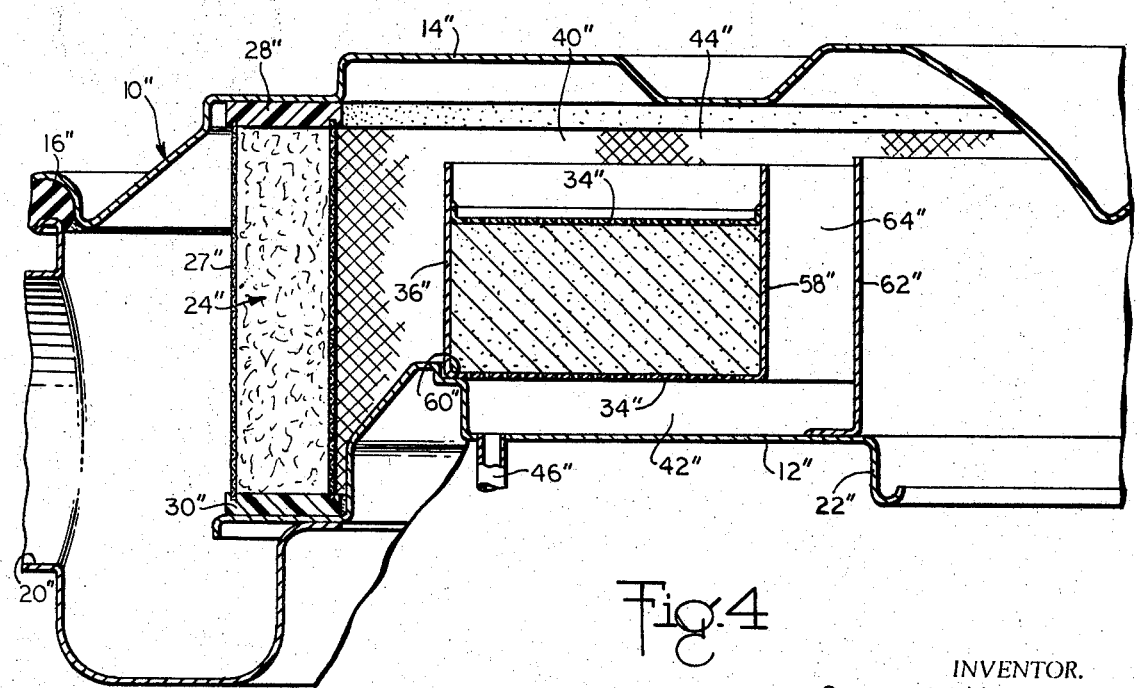

FIG. 4 shows a still more further modification of the carbon bed filter element 26''. In this instance, the two vertical sides of the carbon bed filter element are constituted by annular concentrically mounted nonperforated baffles 36'' and 58''. The remaining two opposite side portions of the filter again are constituted by perforated sheet screens 34''. The filter is mounted at one radial edge portion 60 so as to define upper and lower annular clearance spaces 40'' and 42'' between the filter and the top and bottom air cleaner housing portions respectively, as in FIG. 1. The upper clearance space constitutes an orifice 44''.

In this instance, however, a third annular baffle 62 is concentrically mounted with respect to the first and second baffles 36'' and 58'' and secured to the air cleaner tray portion 12'' spaced radially from second baffle means 58'', as shown. This provides an annular passage 64 that extends at right angles to the lower portion or passage 42'' to provide a tortuous or labyrinthian-type flow path for the flow of air through and out of the filter element 26'' towards the outlet 22''. Accordingly, the third baffle 62 and the passage 64 constitute a further restriction or an inhibitor to the flow of fuel vapors from tube 46'' to the outlet 22''.

From the foregoing, it will be seen that the invention provides an air cleaner fuel vapor adsorption filter element construction that insures that the entire filter element is exposed to the vapors before vapor breakthrough to the atmosphere may occur. It will also be seen that with the particular configuration described, the efficiency of the system is increased considerably because of the increased surface area presented for the retention of fuel vapors by adsorption. It will also be seen that the particular configuration shown and described decreases the flow restriction by presenting a greater surface area of contact for the airflow, this lower restriction resulting in a more effective desorption; which, of course means a higher working capacity of the carbon particles resulting in less overall carbon required. It will further be seen that the invention provides an efficient and effective fuel vapor adsorbent purging device that minimizes the flow of excess fuel vapors and thereby unburned hydrocarbons into the atmosphere.

While the invention has been illustrated and described in its preferred embodiments, it will be clear to those skilled in the arts to which it pertains that many changes and modifications may be made thereto without departing from the scope of the invention.

I claim:

1. An engine air cleaner assembly of the dry element type comprising an essentially horizontally disposed hollow cylindricallike housing defined by a bottom tray member and a cover member mounted thereon and having a side fresh air inlet and an axially disposed outlet, a pair of concentrically mounted ring filter elements disposed in said housing, the outer of said filter elements extending between the tray and cover members in substantially sealing engagement therewith, the inner of said elements containing a bed of activated carbon adapted to be connected to a source of fuel vapors for adsorption thereof at times and desorption thereof upon flow of air through said bed, said inner filter element being essentially horizontally disposed including means for axial flow therethrough, said inner element being axially spaced from said cover and bottom tray members of said housing to provide upper and lower airflow spaces therebetween, said upper space communicating directly with said outlet bypassing said inner filter element and being sized to cause a restriction to flow therethrough sufficient to force airflow through said inner filter element from said inlet to said outlet, means connecting said lower space through a portion of said housing to a source of fuel vapors and to said outlet, and annular baffle means sealingly secured to said inner filter element adjacent said outer filter element and extending in a generally vertical direction for controlling the flow of fuel vapors from said inner filter element radially outwardly thereof towards said inlet and for guiding the flow of air from said inlet through said outer filter element into said inner filter element into said lower space.

2. An assembly as in claim 1, said baffle means extending vertically above said inner filter to inhibit flow of fuel vapors towards said inlet until after the adsorption capacity of said inner filter element has been exceeded.

3. An assembly as in claim 1, including additional baffle means secured to said inner filter element radially inwardly of said first mentioned baffle means and projecting radially outwardly from said inner filter element to inhibit the flow of fuel vapors towards said outlet.

4. An assembly as in claim 1, said inner filter being substantially rectangular in cross section with said baffle means being impervious and comprising one side and perforated screen plate means constituting the remaining sides.

5. An apparatus as in claim 4, including additional baffle means secured to said inner filter element radially inwardly of said first mentioned baffle means and projecting radially outwardly from said inner filter element to inhibit the flow of fuel vapors towards said outlet.

6. An assembly as in claim 1, including additional concentrically mounted annular impervious baffle means secured to said inner filter element radially inwardly of said first mentioned baffle means to define the axial flow path through said inner filter element and confine said fuel vapors to the space between said baffle means.

7. An apparatus as in claim 6, including further annular baffle means secured to said housing radially inwardly of said inner filter element and together with said first mentioned and additional baffle means defining a tortuous flow path for the air and fuel vapors towards said outlet.

8. An assembly as in claim 6, including third concentrically mounted annular baffle means radially spaced inwardly from said additional baffle means and together therewith defining an annular vertically disposed flow channel connected to said lower space for inhibiting the access of fuel vapors in said lower space to said outlet.